D. SNITJER.
Adjustable Compensating Journals.

No. 149,613. Patented April 14, 1874.

Attest:
Wm P. Spalding
C. E. B. Custis

Inventor:
D. Snitjer
By Attorney
Thos. S. Sprague

UNITED STATES PATENT OFFICE.

DRIKUS SNITJER, OF CHICAGO, ILLINOIS.

IMPROVEMENT IN ADJUSTABLE COMPENSATING-JOURNALS.

Specification forming part of Letters Patent No. 149,613, dated April 14, 1874; application filed February 14, 1874.

*To all whom it may concern:*

Be it known that I, DRIKUS SNITJER, of Chicago, in the county of Cook and State of Illinois, have invented an Improvement in Adjustable Compensating-Journals, of which the following is a specification:

The nature of this invention relates to a stud to be secured to the standard of a sewing-machine, with portions of its inner projecting end screw threaded to receive two cup-shaped nuts which form the bearings for the cranked driving-wheel, which has conical hub ends, the said bearings being secured at any point on the stud by set-screws. The purpose of this arrangement is to permit the wheel to be adjusted or shifted in position on the stud, while provision is also made for taking up the wear of the bearings.

Figure 1:
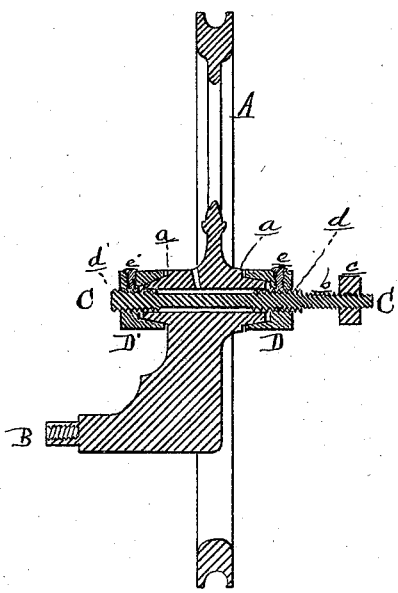
Figure 2:
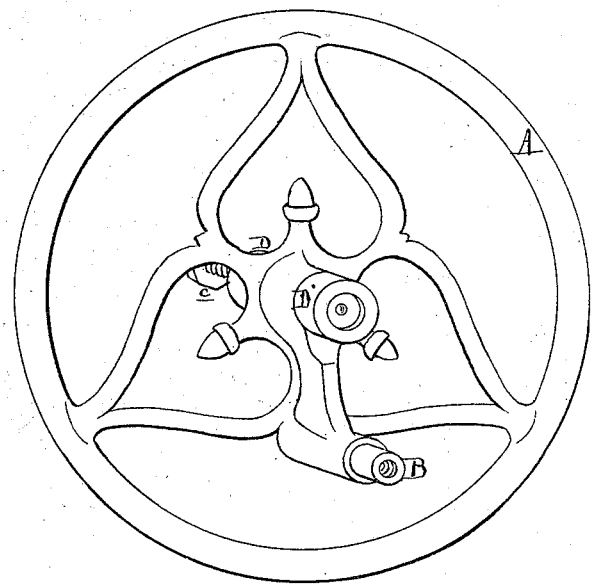

Figure 1 is a cross-section of a sewing-machine driving-wheel, showing the stud and adjustable bearings in longitudinal section. Fig. 2 is a perspective view of the wheel.

In the drawing, A represents the driving-wheel of a sewing-machine, the ends of whose hub terminates in truncated cones $a$. B is a wrist-pin, formed at the extremity of a crank-lug molded on one of the wheel-arms. C is a stud threaded at $b$, where it passes through the standard of a sewing-machine, being secured thereto by a nut, $c$, on the outside. The hub is bored to slip over the inner projecting end of the stud, which is screw-threaded at $d$ $d'$ to receive the nuts D D', which are conically recessed or cupped on their inner faces to receive the cones of the hubs. The nuts D D' are respectively provided with set-screws $e$ $e'$, to fasten them at any point on the threaded portions of the stud.

The nut-bearings D D' may be moved to and fro on the stud to adjust the wheel A with relation to the driven pulley of the machine-head, while they may be also moved toward each other to take up the wear of the bearings.

What I claim as my invention, and desire to secure by Letters Patent, is—

The herein-described adjustable compensation-journal, consisting of the stud C, provided with a nut, $c$, for securing it to the frame, and the cup-nuts D D' threaded thereon, in combination with the wheel A, having a cone-ended hub, $a$, substantially as described.

DRIKUS SNITJER.

Witnesses:
WM. H. LOTZ,
H. P. BISCHOFF.